United States Patent [19]

Posso

[11] Patent Number: 4,532,728
[45] Date of Patent: Aug. 6, 1985

[54] PORTABLE VIEWER FOR PHOTOGRAPHIC SLIDES

[75] Inventor: Patrick Posso, Lausanne, Switzerland

[73] Assignee: Posso S.A., Paris, France

[21] Appl. No.: 575,653

[22] Filed: Jan. 31, 1984

[30] Foreign Application Priority Data

Feb. 9, 1983 [FR] France ................................. 83 02059

[51] Int. Cl.³ ............................................. G02B 27/02
[52] U.S. Cl. ....................................... 40/367; 40/366; 40/363
[58] Field of Search ................. 40/366, 367, 361, 362, 40/363, 365; 350/4.1, 4.2, 133, 134, 140, 141, 143; 353/25, 29, 35, 72, 73, 74, 75, 77, 78, 89, 97, 98, 99, 119

[56] References Cited

U.S. PATENT DOCUMENTS

| | | | |
|---|---|---|---|
| 1,463,624 | 7/1923 | Mabee | 40/367 |
| 2,345,416 | 3/1944 | Naramore | 40/363 |
| 2,602,366 | 7/1952 | De Liso | 40/365 |
| 2,621,993 | 12/1952 | Miles | 40/366 |
| 2,892,274 | 6/1959 | Afton | 40/362 |
| 2,943,409 | 7/1960 | Maiershofer | 40/366 |
| 2,954,623 | 10/1960 | Giwosky | 40/367 |
| 3,018,575 | 1/1962 | Barre et al. | 40/362 |
| 3,675,354 | 7/1972 | Webb | 40/367 |
| 3,748,765 | 7/1973 | Bass et al. | 40/367 |
| 4,372,068 | 2/1983 | Knapp et al. | 40/367 |

FOREIGN PATENT DOCUMENTS

| | | | |
|---|---|---|---|
| 395464 | 3/1909 | France | 40/363 |
| 143664 | 3/1980 | German Democratic Rep. | 40/367 |

*Primary Examiner*—Gene Mancene
*Assistant Examiner*—James Hakomaki
*Attorney, Agent, or Firm*—Dennison, Meserole, Pollack & Scheiner

[57] ABSTRACT

The viewer is constituted by a monolithic housing in plastic material, presenting a window with side guides and an external slot for inserting the slides, said window separating a chamber closed by a lens, from a receptacle containing a source of light and its supply means.

According to the invention, the supply and lighting means are re-grouped inside a removable unit, which can be extracted from the receptacle housing it and in which it is connected; said receptacle comprising opposite the lens, a reflecting surface inclined to form an angle of about 45° with the optical axis.

4 Claims, 1 Drawing Figure

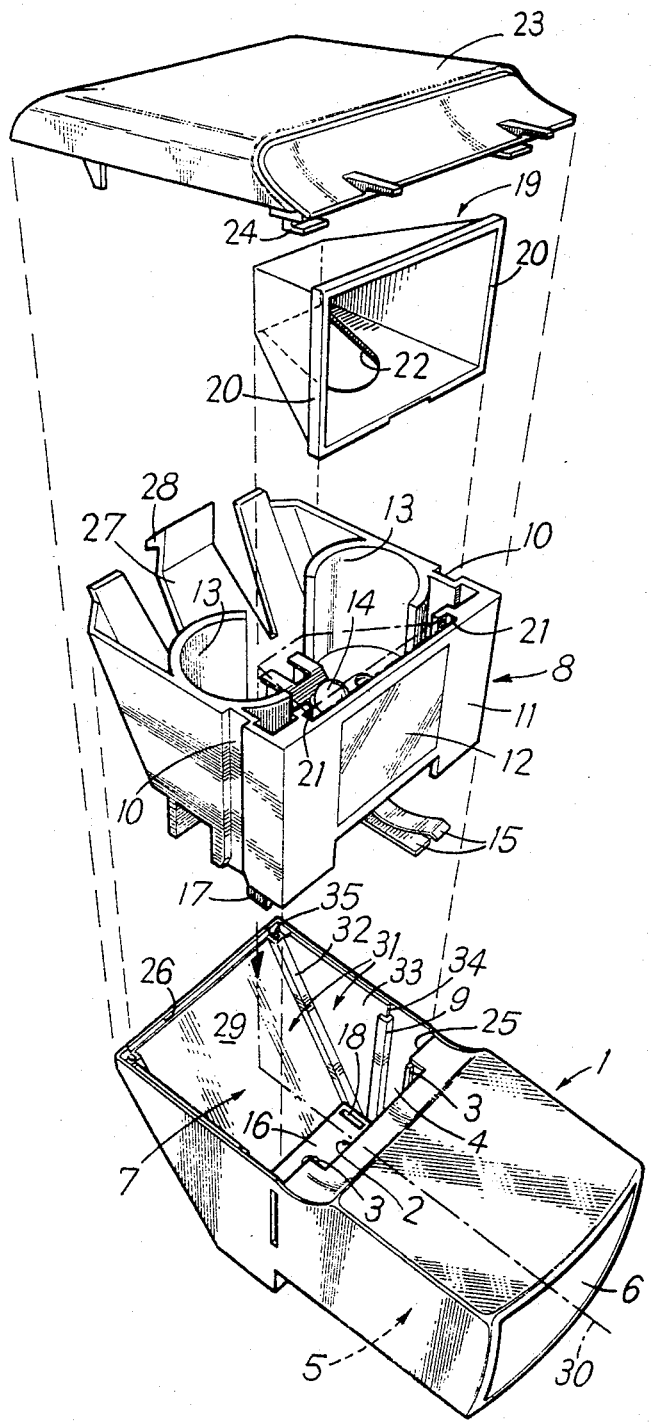

PORTABLE VIEWER FOR PHOTOGRAPHIC SLIDES

The present invention relates to a portable viewer for photographic slides.

Such viewers are known and are constituted by a monolithic housing in plastic material, presenting a window with side guides and an external slot for inserting the slides, said window separating a chamber closed by a lens, from a receptacle containing a source of light and its supply means, either independent means such as dry cells, batteries, or through the mains supply after transformation.

These viewers have one disadvantage which is the risk of being unusable if for example, the batteries are found to be dead when it is about to be used and there is no mains plug close by. Also, the life period of a battery is relatively short, and for prolonged use, the costs of batteries remains high, which actually justifies the use of the mains supply.

It is the object of the present invention to overcome the aforesaid disadvantage by overruling the electrical supply whenever necessary. A further object is to obtain special effects of the image by using diffuse daylight and/or an external source of artificial light, optionally associated to screens, filters or the like.

This object is reached according to the invention, by re-grouping the supply and lighting means inside a removable unit, which can be extracted from the receptacle housing it and in which it is connected; said receptacle comprising opposite the lens, a reflecting surface inclined to form an angle of about 45° with the optical axis and designed to send back, when the unit has been removed, the outside light (from a natural or artificial source) on to the slide window.

According to one particularly advantageous embodiment, the reflecting surface is the wall surface of a flat piece in molded plastics, such as white polystyrene, said piece being integral with guide strips adapted to be guided in translation at 45° in slide guides provided in the housing.

The viewer can also comprise a removable reflector in white molded plastics, said reflector of preferably pyramidal shape, having side strips adapted to be guided in translation in slide guides provided in the unit and situated on either side of the window, said reflector defining an opening for admitting the bulb of the lighting unit containing the reflector.

The invention will be more readily understood on reading the following description with reference to the accompanying drawing in which the one and only figure is a synoptic perspective of the viewer according to the invention.

According to the drawing, the viewer is constituted by a monolithic housing 1 in molded plastic material, black to prevent internal reflection of the light. An inner wall defines a window 2 bordered by side guides 3 for introduction and removal of slides through an access slot 4, said guides further permitting to position the slide sufficiently accurately to obtain a perfectly clear image.

Said wall separates, inside the housing 1, a dark chamber 5, closed by a magnifying lens 6, from a receptacle 7.

Said receptacle 7 is designed to contain a removable light-supplying unit 8; to this effect, the side walls of the receptacle are equipped with strips 9 projecting on the inside, and the side walls of the unit contain conjugated grooves 10 provided for guiding said unit 8 in or out of the receptacle, and for positioning it accurately inside said receptacle; in this position, the front wall 11 of the unit extends against or close to said inner wall of the housing, a translucid plate 12, integral therewith, being situated in facing relation to the window 4.

Unit 8 comprises two circular fittings 13 for housing independent supply batteries. It further comprises electrical contacts connecting an electric bulb 14 either to the batteries or to a power cord, not shown, the connection with which neutralizes the batteries when the cord is plugged into the mains. In any case, regardless of the supply source used, the electrical connection of the bulb is controlled by a thermal switch 15 which is closed by the action of introducing a slide into slot 4 and pushing it down along side guides 3 between window 2 and translucid plate 12, said thermal switch 15 being mounted in series with another subjacent thermal switch, not shown in the drawing, which is controlled by a push button provided on the housing 1, and also not shown in the drawing.

Moreover, unit 8 is dismountably mounted in housing 7 and is provided to this effect with, on its lower face normally resting against a false bottom 16 of the housing, two projecting and elastically-locking teeth 17, designed to penetrate into corresponding slots 18 in said false bottom, the two teeth being in opposite relation one with the other. These teeth are double-angled so that when pushing them in (i.e. when introducing the unit) or pulling them out (i.e. when pulling said unit out) the teeth automatically retract and then return elastically to their initial position; in that position, and when unit 8 is inside the receptacle 7, said teeth lock on to the edges of the slots 18 forming lock-notches, and thus hold said unit in its geometrically defined position, opposite the lens 6.

Unit 8 is also provided with a reflector 19 which sends back the light issued from bulb 14, through the slide inserted in front of window 2, onto the lens 6. Said reflector 19 has to be removable, especially to allow replacement of the bulb. Said reflector is molded from a white plastic material and, in the illustrated example, it is pyramid-shaped. It must always be positioned with accuracy with respect to the bulb and is provided to this effect, with side strips 20 guided in translation as far as a low-down stop member inside slide guides 21 of the unit, said guides being situated on either side of the translucid plate 12; the lower face of the reflector defines an opening 22 to allow the bulb 14 through.

When the unit 8, equipped with its reflector 19 and fitted with batteries and a bulb, is introduced into receptacle 7 and locked in position therein, a cover 23 is placed over housing 1. Said cover 23 is equipped at the front, for positioning purposes, with two right-angled brackets 24 fitting under the border 25 of housing 1, and at the back, with a downwards projecting flanged-portion, not shown in the drawing, which is insertable in border 26 of said housing. To lock said cover is position, the unit 8 is provided at the back with an elastically deformable blade 27 extended by a latch 28 which engages the projecting part of the downward-projecting flanged portion of the cover.

Unit 8, thus constituted, forms a removable assembly, which, when cover 23 is taken off, can be taken out of the receptacle 7 to free the inside thereof. The object is that if the internal source of light should fail for any reason whatsoever, or if a main plug is not available and the user wants to save his batteries, or else if the user simply wishes to take advantage of another luminosity of external origin, then there is a possibility to receive the outside light from the top, and to transfer is horizontally through the empty space inside the receptacle 7, so that it reaches the lens 6, through any slide inserted in front of the window 2 of housing 1.

Such possibility is procured by a reflecting surface 29 which is inclined to form an angle of about 45° with the optical axis 30. Thus, by holding the viewer horizontal before the eyes when the unit 8 is inserted therein, the image of the inserted slide, viewed through the lens 6, is luminous, provided of course that the top aperture of the housing with the cover removed, is facing the sun or an artificial light.

In the illustrated example, the reflecting surface 29 is a flat face of a piece 31 in molded plastics such as white polystyrene. Said piece is a U-shaped section, with edges 32 joining the web 29 to the side wings 33 and forming with the free edges 34 thereof, an angle of 45°; said wings 33 line the side walls of housing 1 and, in order to hold the part 31 in position, the edges 34 are inserted in the angled strips 9 of said housing, whereas U-shaped sections defining the aforesaid edges 32 are inserted on slide-bars 35 bordering at 45° the side walls of said housing.

The reflection surface can also be produced in other ways. For example, it can be produced by depositing a fine metal layer under vacuum on the inside face of an inclined wall of housing 1, or by applying on said wall, an adhesive sheet of polished metal or the like.

The invention is in no way limited to the description given hereinabove and on the contrary covers any modifications that can be brought thereto without departing from its scope.

What I claim is:

1. A portable viewer for photographic slides comprising a housing, a viewing lens mounted on said housing and defining an optical axis, a receptacle defined in said housing inward of said lens, light means for generating and supplying artificial light comprising a removable unit mounted in said receptacle and aligned with said lens along said optical axis, means for removably receiving and positioning a slide between said lens and said light means for illumination by said light means and viewing through said lens, a light reflecting surface aligned with said viewing lens inward of said light means removable unit, relative to said lens, and inclined at an acute angle to said optical axis, said light means removable unit, when mounted in said receptacle, being interposed between said light reflecting surface and said means for receiving and positioning a slide, and aperture means in said housing aligned with said light reflecting surface and laterally of said optical axis for a selective directing of light from a source remote from said housing to said light reflecting surface for reflection to said lens and along said optical axis upon removal of said light means removable unit, said light means removable unit being laterally slidable into and out of said housing through said aperture means.

2. The viewer of claim 1 including lock means for selectively locking said light means removable unit in position in said housing, said lock means including cooperating teeth and tooth receiving slots on the light means removable unit and the housing within the receptacle between the light reflecting surface and the lens, and switch means for selectively energizing said light means in response to introduction of a slide.

3. The viewer of claim 2 including a removable closure for said aperture means, and lock means for releasably locking said closure to said light means removable unit when said unit is in said housing.

4. The viewer of claim 2 wherein said light reflecting surface is inclined at approximately 45° to said optical axis.

* * * * *